No. 757,293. PATENTED APR. 12, 1904.
S. GANTZ.
DUMPING CART.
APPLICATION FILED NOV. 7, 1903.
NO MODEL. 2 SHEETS—SHEET 1.
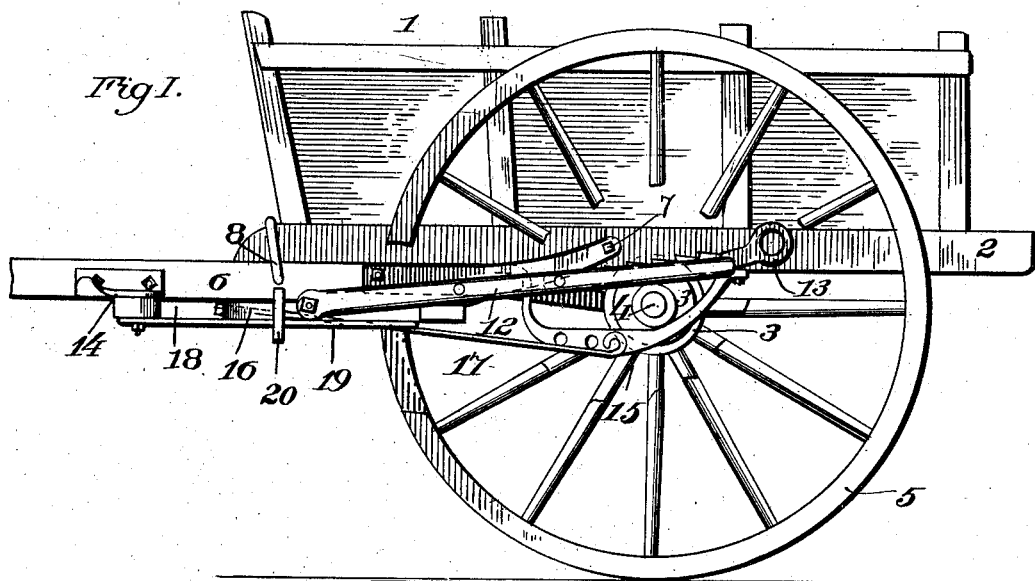
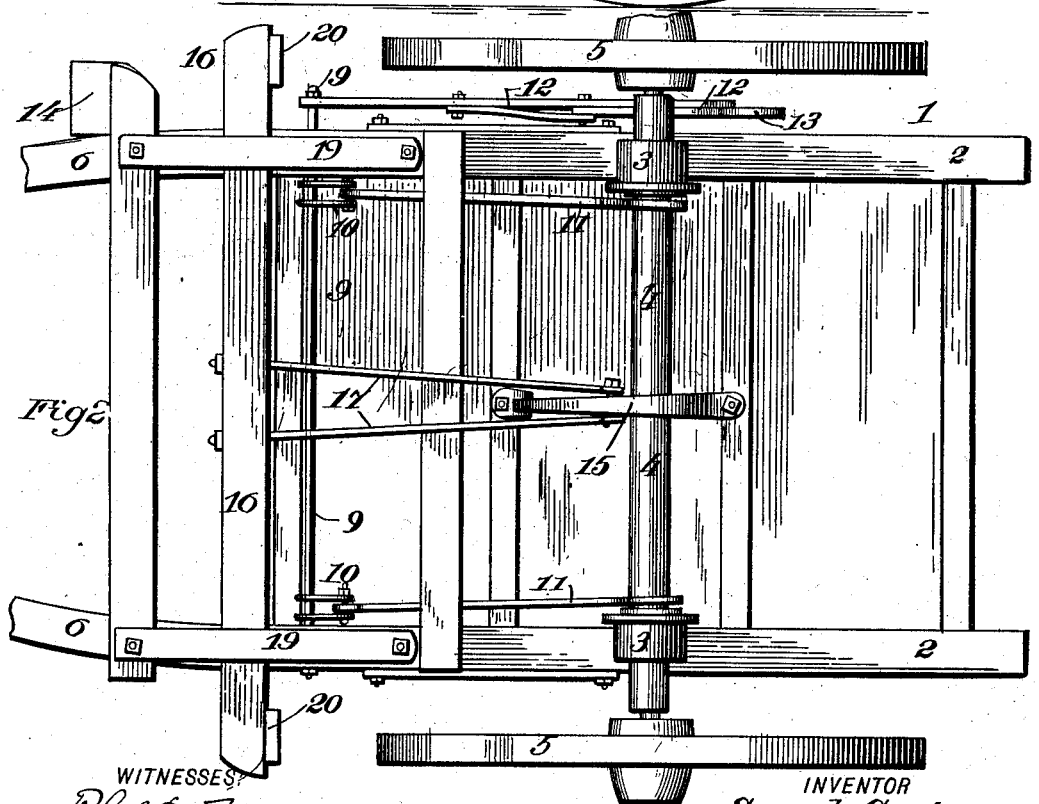
WITNESSES:
INVENTOR
Samuel Gantz.
BY
ATTORNEYS

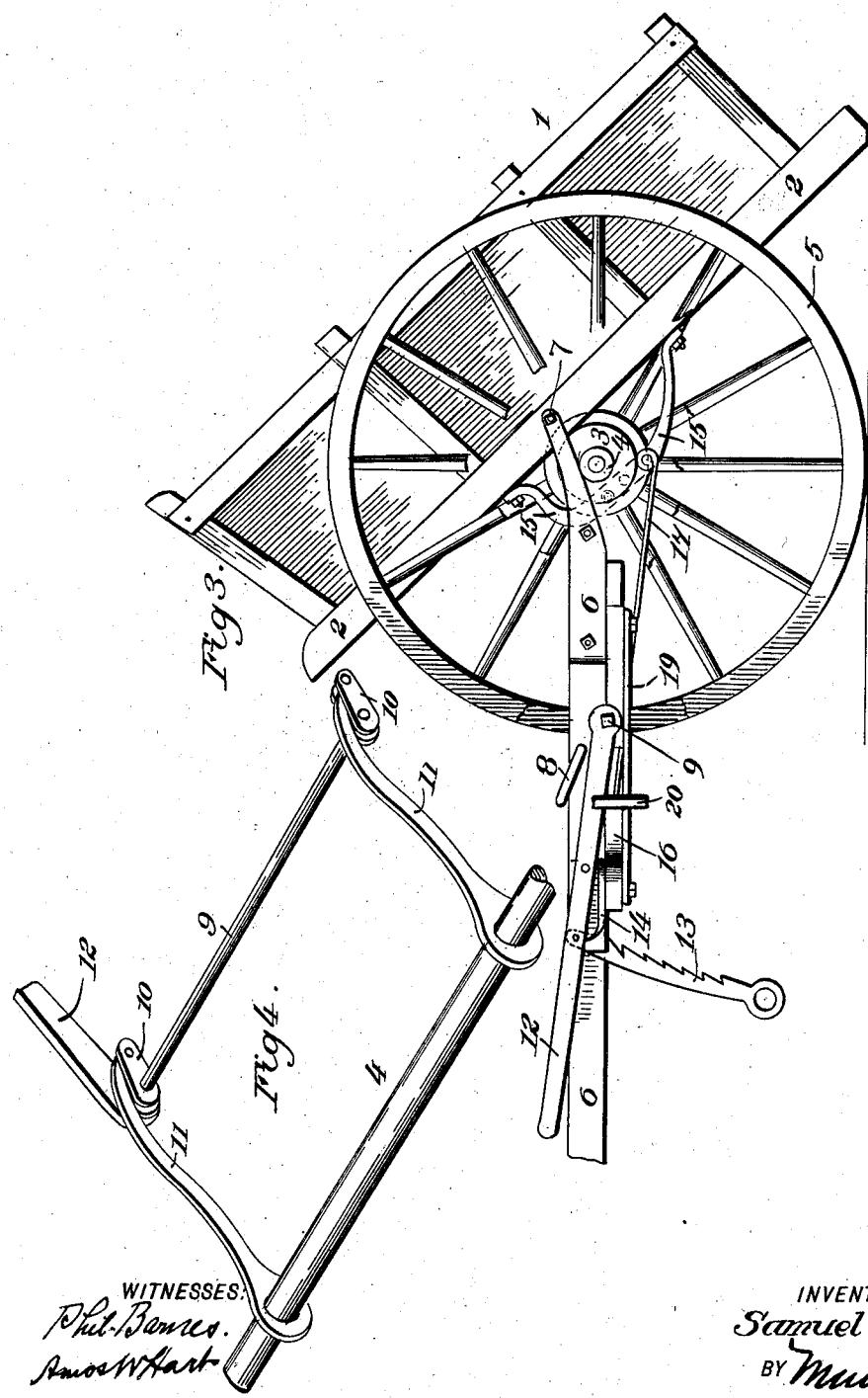

No. 757,293. Patented April 12, 1904.

UNITED STATES PATENT OFFICE.

SAMUEL GANTZ, OF HAGERSTOWN, MARYLAND, ASSIGNOR OF ONE-HALF TO CHARLES C. COCHRAN, OF HAGERSTOWN, MARYLAND.

DUMPING-CART.

SPECIFICATION forming part of Letters Patent No. 757,293, dated April 12, 1904.

Application filed November 7, 1903. Serial No. 180,189. (No model.)

*To all whom it may concern:*

Be it known that I, SAMUEL GANTZ, a citizen of the United States, and a resident of Hagerstown, in the county of Washington and State of Maryland, have made certain new and useful Improvements in Dumping-Carts, of which the following is a specification.

My present invention is an improvement upon the dumping-cart for which I have received Letters Patent No. 405,770. I have devised certain features whereby the cart is improved in construction and operation, as will be hereinafter specifically indicated. The details of construction, arrangement, and operation will be understood by reference to the accompanying drawings, in which—

Figure 1 is mainly a side view of my improved dumping-cart, a portion being broken away to illustrate certain important features of construction and arrangement. Fig. 2 is a plan view of the dumping-cart inverted, the movable parts being shown in the same relation as in Fig. 1. Fig. 3 is a side view of the cart, illustrating the same in the operation of dumping. Fig. 4 is a perspective view of mechanism for shifting the cart-body on the axle for effecting the dumping.

1 indicates the cart-body, which is provided with sills or side bars 2, that rest upon flanged collars 3, mounted loose on the axle 4. The latter is provided with running wheels 5 of ordinary construction, and shafts 6 are connected with and hinged to the cart-body, as shown at 7 in Figs. 1 and 3. A hinged bail 8 is applied to the shafts 6 and adapted to swing over and engage the beveled or rounded front ends of the side bars 2 of the cart-body. In respect to the above-indicated parts the present invention is substantially similar to that for which I have received a patent as aforesaid. As in the former case, the dumping is effected by shifting the axle 4 forward of its normal position, the bail 8 being also thrown off, as will be understood by reference to Fig. 3, the axle being thus placed forward of the middle of the cart-body, so that the latter is tilted automatically by the effect of gravity. In the present case the cart-body is tilted practically in the same manner; but the forward movement of the axle is effected by different means. In the former invention a hand-lever was applied to the axle for rotating it, and the axle was provided with crank-arms, which were connected by rods or bars with a cross-bar fixed to the shafts in front. Thus when the axle was shifted forward it was rotated in a direction opposite to the direction of rotation of the flanged collars 3, and the friction due to the weight of the load imposed on the collars and axle was sufficient to render this operation difficult. I have therefore dispensed with such lever and provided an improved mechanism for shifting the axle, as will now be described.

As shown best in Fig. 2, a rock-shaft 9 is arranged transversely beneath the shafts 6 and in bearings connected with the same, the shaft being located a short distance in front of the wheels 5. The said shaft is provided with short crank-arms 10, which are connected by rods 11 with the axle 4. (See Fig. 4.) It is apparent that by rotating the said shaft 9 the axle will be moved forward or back correspondingly. This operation is effected by means of a hand-lever 12, which is applied to one end of the rock-shaft 9 and is adapted to swing in a vertical plane, so that when the cart-body 1 is in normal position, as for transporting loads, it lies thrown back upon the axle; but when the cart-body is dumped the lever is swung over to the forward position, as shown in Fig. 3. The lever is provided with a combined pull-bar and locking device 13, which is practically a toothed or ratchet bar provided with a handle at its free end. Such device is pivoted to the lever 12 at a point near its middle, and is thus adapted to swing and lie alongside the lever, as indicated in several figures. A catch 14, adapted to engage the locking-bar 13, is attached to one of the shafts 6 and projects laterally therefrom, its forward edge being duly beveled, as required, for engagement with the teeth of said bar. By means of the lever 12 the rock-shaft 9 is easily rotated in its bearings, and by means of its crank-arms 10 and the connecting-rods 11 the axle 4 may be drawn forward with comparative ease even when the cart is heavily loaded. It will be understood that upon releasing the bail the cart-body will then dump automatically, as indicated in Fig. 3. The bail 8 is thrown off before the axle is shifted forward. As indicated in Figs. 1, 2, 3, a bent bar or keeper 15, which may be termed a "stirrup," is attached to the under side of the cart-body 1 and passes under the axle 4. It is arranged centrally between the wheels 5 and is operatively connected with a sliding brake-bar 16 by means of rods 17. As shown in Fig. 1, this stirrup 15 is provided with a series of holes, so that the point of connection between it and the rod 17 may be shifted forward or back, as conditions require. The aforesaid brake-bar 16 is adapted to slide in a guideway 18, (see Fig. 1,) which is formed by means or a metal plate 19, secured to the under side of each shaft 6 and duly spaced therefrom. The length of the rods 17, which connect the brake-bar with the stirrup 15, is such that when the rock-shaft 9 is rotated for the purpose of shifting the axle 4 forward to the position required for dumping the shoes 20 of the brake-bar come in contact with and lock the wheels 5. This lock is, however, relieved the instant the body 1 tilts, as shown in Fig. 3, and the parts assume the position there indicated, since the lever 12 is left free to drop vertically. In my previous invention I employ two such stirrups as here indicated, and the brake-bar was fixed instead of being movable, as in this case. There was also no provision for adjustment of the relation or distance between the brake-bar and the axle, as in this case.

In my former invention the wheels remained locked by the brake when the cart-body tilted. The freedom of movement obtained in the present case is a considerable aid in the operation of tilting the body.

What I claim is—

1. In a dumping-cart, the combination with the body, the axle provided with wheels, collars mounted loosely on the axle, and shafts which are pivotally connected with the body, of a rock-shaft journaled in the shafts, means for rotating the same, and means for connecting it with the axle for the purpose of drawing the latter forward as required for tilting the body, substantially as described.

2. In a dumping-cart, the combination with the body, the axle, wheels and collars mounted loosely thereon, and shafts pivotally connected with the body, of a transverse rock-shaft having crank-arms, rods connecting said arms with the axle, and a lever applied to the projecting end of the rock-shaft, substantially as and for the purpose specified.

3. In a dumping-cart, the combination with the body, the axle, collars and wheels mounted thereon, and shafts pivotally connected with the body, of the means for shifting the axle and thereby effecting the dumping of the body automatically, the same consisting of a transverse rock-shaft and rods connecting it with the axle, a hand-lever affixed to the rock-shaft, and a combined pull and locking bar pivoted to said lever, and a catch attached to one of the shafts and adapted for engagement with the locking-bar, substantially as described.

4. In a dumping-cart, the combination with the tiltable body, the axle provided with supporting-wheels, and shafts pivotally connected with the body, of a keeper arranged centrally between the wheels and attached to the under side of the body so as to embrace the axle, a slidable brake-bar arranged in front of the wheels, and rods connecting rigidly with the aforesaid keeper, and means for shifting the axle forward, the brake-bar being moved forward when the body tilts, substantially as described.

his
SAMUEL × GANTZ.
mark

Witnesses:
HARVEY H. HEYSER,
FRANK G. WAGAMAN.